United States Patent
Sato et al.

(10) Patent No.: US 6,219,334 B1
(45) Date of Patent: Apr. 17, 2001

(54) RECEIVING APPARATUS FOR RECEIVING ORTHOGONAL FREQUENCY DIVISION MULTIPLEXING SIGNAL AND RECEIVING METHOD THEREOF

(75) Inventors: Kazumi Sato, Yokohama; Minoru Namekata, Kawasaki, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/041,120

(22) Filed: Mar. 12, 1998

(30) Foreign Application Priority Data

Mar. 14, 1997 (JP) .................................................. 9-061468

(51) Int. Cl.[7] .................................................. H04B 1/74
(52) U.S. Cl. .......................... 370/210; 370/291; 375/232; 375/285; 375/350; 455/65; 455/506
(58) Field of Search .................................... 370/203, 210, 370/282, 290, 291, 319, 324, 344, 484, 497; 375/324, 325, 350, 346, 347, 285, 267, 229, 232; 455/295, 296, 65, 506

(56) References Cited

U.S. PATENT DOCUMENTS 5,483,529 * 1/1996 Baggen et al. ........................ 370/210
5,802,117 * 9/1998 Ghosh .................................. 375/344

* cited by examiner

Primary Examiner—Wellington Chin
Assistant Examiner—Frank Duong
(74) Attorney, Agent, or Firm—Oblon, Spivak, McClelland, Maier & Neustadt, P.C.

(57) ABSTRACT

A coherent detection type OFDM receiver is disclosed. The coherent detection type OFDM receiver demodulates a digital data sequence. The OFDM receiver obtains a channel frequency response with a frequency spectrum of a received signal and a frequency spectrum of a reference signal. The channel frequency response is filtered in the frequency domain by a filter. At this point, the OFDM receiver estimates delay time of a received delayed signal and designates the bandwidth of the filter with the estimated result. The OFDM receiver compensates the distortion of the waveform of the received signal with the channel frequency response that has been filtered by the filter and demodulates a digital data sequence with the received waveform that has been compensated.

12 Claims, 9 Drawing Sheets

FIG. 9

RECEIVING APPARATUS FOR RECEIVING ORTHOGONAL FREQUENCY DIVISION MULTIPLEXING SIGNAL AND RECEIVING METHOD THEREOF

BACKGROUND OF THE INVENTION

1. Field of the Invention

The present invention relates to a receiving apparatus for use with a radio communication system for transmitting for example an orthogonal frequency division multiplexing signal (hereinafter referred to as OFDM signal) and a receiving method thereof.

2. Description of the Related Art

In a recent radio communication system, a performance for transmitting a large amount of information such as picture data, in particular, moving picture data, as well as simple text data is required. Thus, in such a radio communication system, a highly efficient modulation system such as 16-ary QAM system or 64-ary QAM system should be essentially used. The 16-ary QAM system and 64-ary QAM system are modulation systems that modulate information with an amplitude or a phase that varies.

Consequently, such a receiving apparatus (hereinafter referred to as receiver) for use with a conventional radio communication system comprises an RF receiving means for receiving a radio signal modulated corresponding to the 16-ary QAM system or 64-ary QAM system and a demodulating means for coherent detection of the received signal and demodulating the received signal to an original data sequence.

However, in such a radio communication system, due to a multi-path propagation environment, the amplitude and phase of a signal waveform largely distort. Thus, when the receiver receives a distorted radio signal and coherently detects the received signal, a received data sequence that is different from the original data sequence is obtained.

To solve this problem, a technology that cancels or alleviates the distortions of amplitude and phase should be employed in the receiver.

For example, to alleviate the distortion of a channel, a technology for transmitting a reference signal from the transmitter and obtaining the channel distortion with the waveform of a reference signal received by the receiver is known.

When the channel distortion is obtained, the original transmitted signal can be estimated with the received signal. Thus, the receiver performance can be improved.

For example, in the environment of which the above-described orthogonal frequency division multiplexing (OFDM) signal is transmitted, the channel response (in the frequency domain) of the channel can be calculated with each received reference signal and each transmitted reference signal generated by the receiver. However, the channel frequency response contains a thermal noise and so forth generated in the receiver. To suppress the thermal noise, the calculated channel frequency response should be filtered in the frequency domain by a particular filtering means.

When the channel frequency response is filtered in the frequency domain, the Gaussian noise component can be suppressed. Thus, the channel frequency response calculated by the receiver can be approached to the channel frequency response with no Gaussian noise.

In this case, a filtering means with a bandwidth corresponding to the channel frequency response should be used.

In other words, when the bandwidth of the filtering means is designated to a value larger than a proper value, the channel frequency response that has been filtered still contains a large noise component. In contrast, when the bandwidth of the filtering means is designated to a value smaller than the proper value, the channel frequency response gets distorted. Thus, in both the cases, good receiver performance cannot be obtained.

However, in the receiver (receiving apparatus) for use with the conventional radio communication system, the channel frequency response largely depends on the propagation environment of a radio wave. When the moving receiver receives a radio signal, since the propagation environment of the radio wave largely varies, it is almost difficult to use a filtering means with a bandwidth suitable for the propagation environment of the radio wave that varies in such a manner.

SUMMARY OF THE INVENTION

The present invention is made from the above-described point of view.

A first object of the present invention is to improve receiver performance of a receiving apparatus.

A second object of the present invention is to properly compensate the distortion of a received signal due to a multi-path propagation environment even if the propagation environment of a radio wave varies.

To accomplish the above-described objects, the present invention is a receiving apparatus, comprising an RF receiving means for receiving an orthogonal frequency division multiplexing signal, a transforming means for transforming the orthogonal frequency division multiplexing signal received by the RF receiving means into a frequency spectrum signal, a reference signal generating means for generating a reference frequency spectrum signal, a channel frequency response calculating means for calculating a channel frequency response with the reference frequency spectrum signal generated by the reference signal generating means and the frequency spectrum signal transformed by the transforming means, a filtering means for filtering the channel frequency response calculated by the channel frequency response calculating means, a delayed signal estimating means for estimating a delayed signal due a multi-path propagation environment received by the RF receiving means, a bandwidth designating means for designating the bandwidth of the filtering means with information of the delayed signal estimated by the delayed signal estimating means, a distortion compensating means for compensating a distortion in the frequency domain due to the multi-path propagation environment of the frequency spectrum signal transformed by the transforming means with the channel frequency response filtered by the filtering means, and a demodulating means for demodulating the frequency spectrum signal whose distortion has been compensated by the distortion compensating means to a digital data sequence.

Conventionally, the channel frequency response in the frequency domain due to the multi-path propagation environment is calculated with a received signal and a reference signal. However, since the calculated channel frequency response contains a noise, the noise should be suppressed from the channel frequency response by the filter. At this point, it is important to designate the bandwidth of the filtering means that filters the channel frequency response.

Thus, the receiving apparatus estimates a delayed signal due to a multi-path propagation environment and designates the bandwidth of the filtering means corresponding to the estimated result. Consequently, the bandwidth of the filtering means corresponding to the propagation environment can be designated and thereby the noise can be optimally suppressed. Thus, since the distortion of the received signal can be properly compensated, the receiver performance can be improved.

Moreover, in the receiving apparatus, since a plurality of power or amplitude levels and delay times of a estimated delayed signal are stored and the bandwidth of the filtering means is designated corresponding to such information, the designating accuracy of the bandwidth of the filtering means can be improved. In addition, even if the propagation environment instantaneously changes, the designated bandwidth of the filtering means can be prevented from being changed.

Normally, the channel frequency response tends to be affected by a delayed signal with a high reception level.

Thus, since the receiving apparatus designates the bandwidth of the filtering means with the delay time of a delayed signal accurately, even if a plurality of delayed signals arrives at the receiver, the receiving apparatus can designate the bandwidth of the filtering means corresponding to the propagation environment at the point.

These and other objects, features and advantages of the present invention will become more apparent in light of the following detailed description of a best mode embodiment thereof, as illustrated in the accompanying drawings.

DESCRIPTION OF THE PREFERRED EMBODIMENTS

Next, with reference to the accompanying drawings, embodiments of the present invention will be described.

Figure 1:
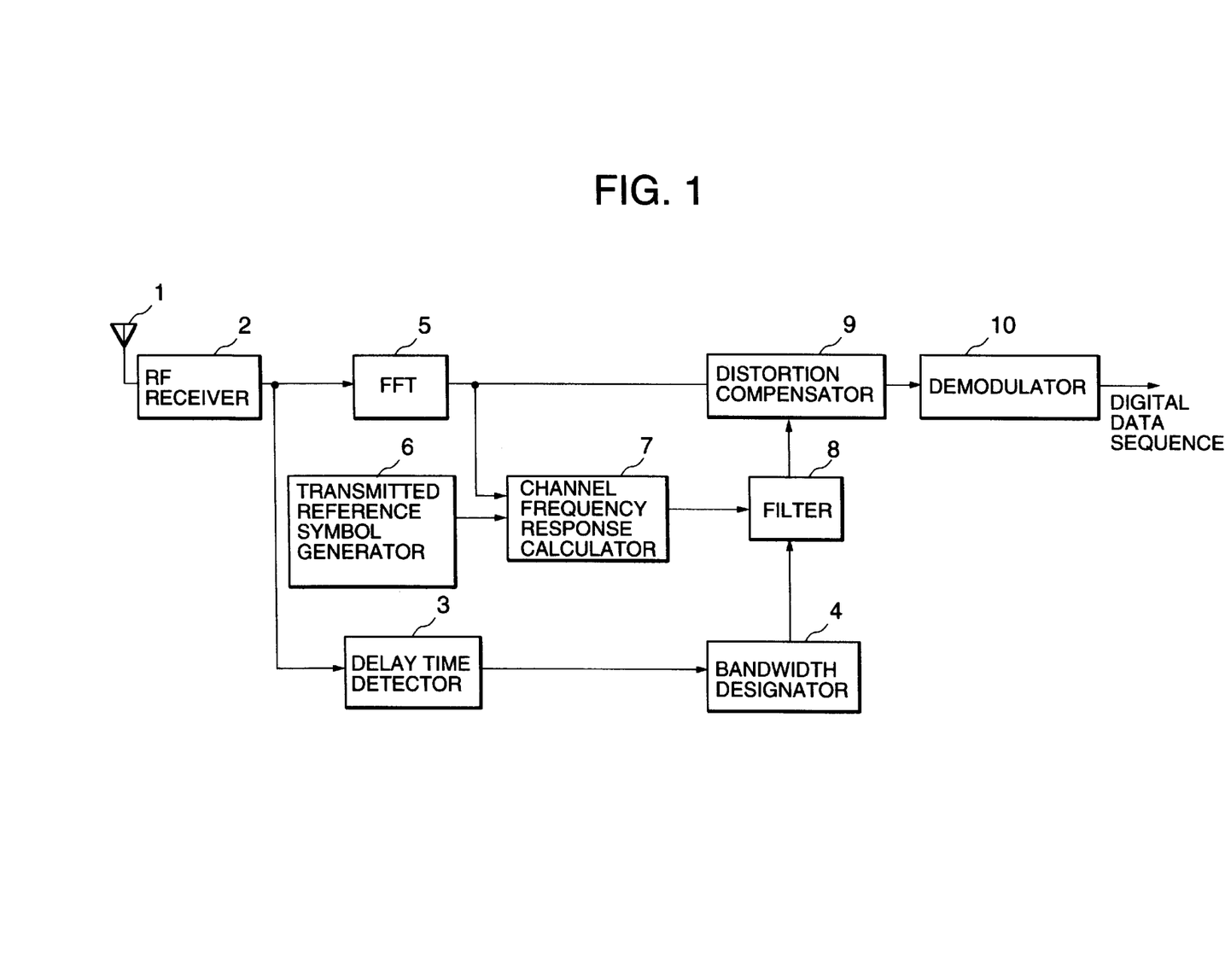
FIG. 1 is a block diagram showing the structure of a synchronous detection type OFDM receiver according to a first embodiment of the present invention.

FIG. 1 is a block diagram showing the structure of a synchronous detection type OFDM receiver according to a first embodiment of the present invention.

Referring to FIG. 1, the synchronous detection type OFDM receiver comprises an antenna 1, an RF receiver 2, a delay time detector 3, a bandwidth designator 4, a fast Fourier transforming portion (FFT) 5, a transmitted reference symbol generator 6, a channel frequency response calculator 7, a filter 8, a distortion compensator 9, and a demodulator 10.

It is assumed that a transmitter (not shown) periodically transmits delay time estimating symbols with a strong correlation on the time axis so as to estimate the delay time of a delayed signal due to a multi-path propagation environment.

The antenna 1 receives OFDM symbols. The RF receiver 2 performs a receiving process for the OFDM symbols received through the antenna 1. The receiving process includes a checking process for checking the type of each OFDM symbol. The OFDM symbols received by the RF receiver 2 are for example a synchronous symbol, a delay time estimating symbol, a channel frequency response calculating symbol, and a data symbol.

When a delay time estimating symbol has been received in the receiving process, the RF receiver 2 outputs the delay time estimating symbol to the delay time detector 3. When the RF receiver 2 receives an OFDM symbol other than the delay time estimating symbol, the RF receiver 2 sends the received OFDM symbol to the fast Fourier transforming portion 5. The delay time detector 3 estimates the delay time of the delayed signal with the received delay time estimating symbol. The filter 8 is for example a transversal filter. The bandwidth of the filter 8 can be variably designated from the outside. The bandwidth designator 4 designates a proper bandwidth of the filter 8 with the delay time of the delayed signal estimated by the delay time detector 3. When the RF receiver 2 receives a data symbol, the fast Fourier transforming portion 5 transforms the data symbol into a signal in the frequency domain corresponding to the fast Fourier transforming process.

When the delay time estimating symbol used as a reception reference symbol after the FFT process, the symbol is supplied to the fast Fourier transforming portion 5. The fast Fourier transforming portion 5 transforms the symbol into a signal in the frequency domain. When it is not necessary to perform the FFT-process for the delay time estimating symbol, the symbol is not supplied to the fast Fourier transforming portion 5. When the RF receiver 2 receives a reception reference symbol for calculating a channel frequency response, the channel frequency response calculator 7 calculates frequency characteristics of the channel frequency response with an output signal of the fast Fourier transforming portion 5 and a transmitted reference symbol generated by the transmitted reference symbol generator 6. The filter 8 suppresses (filters) the noise component contained in the output signal of the channel frequency response calculator 7 with the bandwidth designated in the frequency domain by the bandwidth designator 4. The distortion compensator 9 compensates the distortion of the received data symbol with an output signal of the filter 8 and the output signal of the fast Fourier transforming portion 5 and supplies the resultant signal to the demodulator 10. The demodulator 10 demodulates each sub-carrier signal with the output signal of the distortion compensator 9 and transforms the resultant signal into a digital data sequence.

Figure 2:
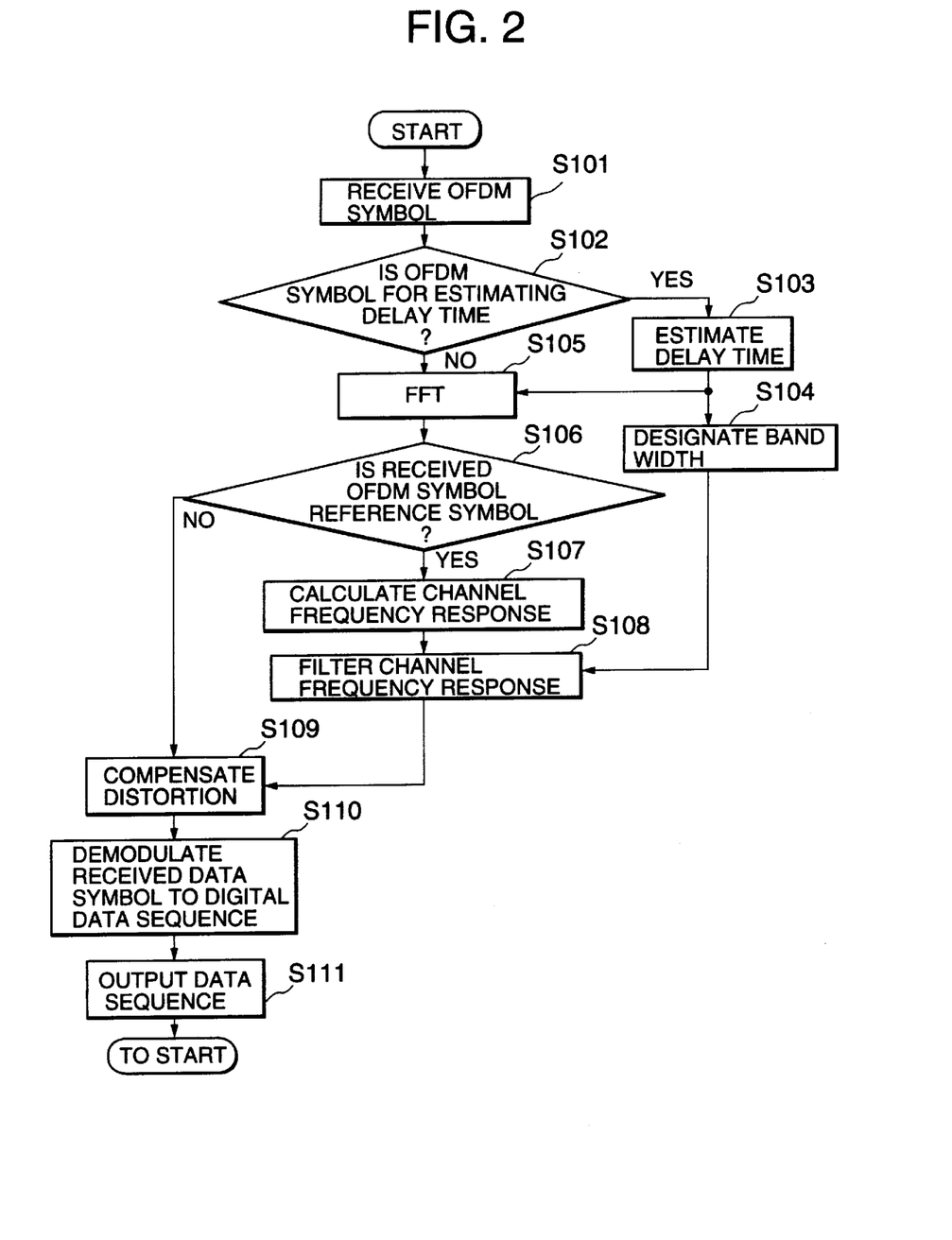
FIG. 2 is a flow chart showing an example of a first operation of the synchronous detection type OFDM receiver according to the first embodiment of the present invention.

Next, the operation of the synchronous detection type OFDM receiver will be described.

FIG. 2 is a flow chart showing the operation of the synchronous detection type OFDM receiver.

Referring to FIG. 2, in the synchronous detection type OFDM receiver, when the RF receiver 2 receives an OFDM symbol (at step 101), it is determined whether or not the received symbol is a delay time estimating symbol with a strong correlation on the time axis (at step 102).

When the received symbol is a delay time estimating symbol (namely, the determined result at step 102 is Yes), the delay time estimating symbol is supplied to the delay time detector 3. The delay time detector 3 estimate the delay time of the delayed signal due to a multi-path propagation environment (at step 103). The delay time estimated result is supplied to the bandwidth designator 4. The bandwidth designator 4 designates the bandwidth of the filter with the delay time estimated result (at step 104).

On the other hand, when the received symbol is not a delay time estimating symbol (namely, the determined result at step 102 is No) or when the received symbol is a delay time estimating symbol for calculating a channel frequency response, the received symbol is supplied to the fast Fourier transforming portion 5. The fast Fourier transforming portion 5 performs the fast Fourier transforming process for the received symbol (at step 105), transforms the received symbol into a signal in the frequency domain, and supplies the resultant signal to the channel frequency response calculator 7.

When the RF receiver 2 receives a reception reference symbol for calculating a channel frequency response (namely, the determined result at step 106 is Yes), the transmitted reference symbol generator 6 generates a transmitted reference symbol and supplies the transmitted reference symbol to the channel frequency response calculator 7.

Since the channel frequency response calculator 7 receives the output signal of the fast Fourier transforming portion (the reception reference symbol that has been transformed into a signal in the frequency domain) and the transmitted reference symbol that has been generated by the transmitted reference symbol generator 6, the channel frequency response calculator 7 calculates the channel frequency response (frequency characteristics) with these symbols (at step 107) and supplies the calculated channel frequency response to the filter 8. The filter 8 filters the channel frequency response in the frequency domain with the designated proper bandwidth (at step 108), suppresses the noise component, and supplies the resultant signal to the distortion compensator 9.

The distortion compensator 9 receives the channel frequency response whose noise component has been suppressed and the received data symbol that has been FFT processed. Thus, the distortion compensator 9 compensates the distortion of the received data symbol with the channel frequency response whose noise component has been suppressed (at step 109) and supplies the resultant received data symbol to the demodulator 10.

The demodulator 10 demodulates the received data symbol whose distortion has been compensated to a digital data sequence (at step 110) and outputs the demodulated digital data sequence (at step 111).

Figure 3:
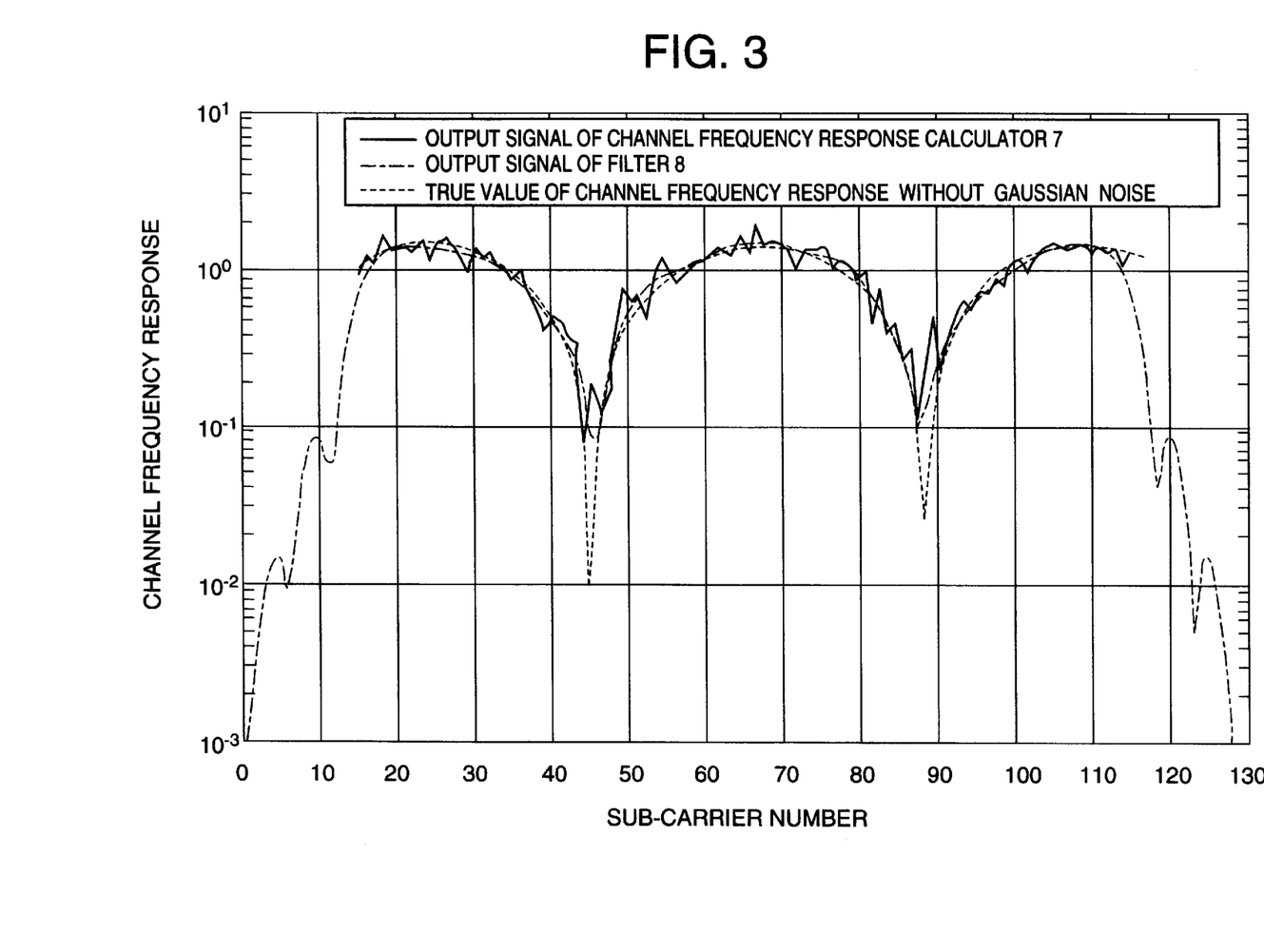
FIG. 3 is a graph showing channel frequency response characteristics of the synchronous detection type OFDM receiver according to the first embodiment of the present invention.

FIG. 3 is a graph showing the relation between sub-carrier numbers of OFDM symbol (horizontal axis) and channel frequency response (vertical axis). In FIG. 3, an output signal of the channel frequency response calculator 7 is represented by a solid line. An output signal of the filter 8 is represented by a dashed line. A true value of the channel frequency is represented by a dotted line.

In the graph, the sub-carrier interval is 1 [kHz]. The number of sub-carriers that transmit a signal is 100. The FFT scale is 128. The modulation system is QPSK. It is assumed that $Eb/No=10$ [dB]; delay time of delayed signal $\tau=30$ [$\mu$sec]; and $D/U=0$ [dB]. In these conditions, a computer simulation is performed for a two-wave model channel frequency so as to obtain a channel frequency response of each sub-carrier.

For filtering a channel frequency response in the frequency domain, a low pass roll-off filter of which the tap length is 32 and the roll-off coefficient is 0.5 is used. Since an output signal of the channel frequency response calculator 7 is filtered in the frequency domain, the bandwidth of the filter 8 is designated in a time region. In addition, the sub-carrier interval of the OFDM symbol is represented by W [Hz]. The single side bandwidth in the time region of the filter is represented by B [1/Hz]. When the normalized bandwidth in the time region of the filter is defined as the single side bandwidth in the time region for the symbol length 1/W, the normalized bandwidth is represented by BW. When BW=0.5, the filter passes all noise components.

In FIG. 3, an example of the output signal of the filter in the case that BW=0.1 is shown. The OFDM symbol shown in FIG. 3 is transmitted with 15th to 114th sub-carriers. FIG. 3 shows that a channel frequency response calculated with a reception reference symbol and a transmitted reference symbol generated by the receiver contains a noise component that is added by the receiver. Thus, the output signal of the channel frequency response calculator 7 finely fluctuates. On the other hand, in the channel frequency response that has been filtered in the frequency domain, the noise component is suppressed. Thus, it is clear that the resultant channel frequency response is close to the true value of the channel frequency response.

Figure 4:
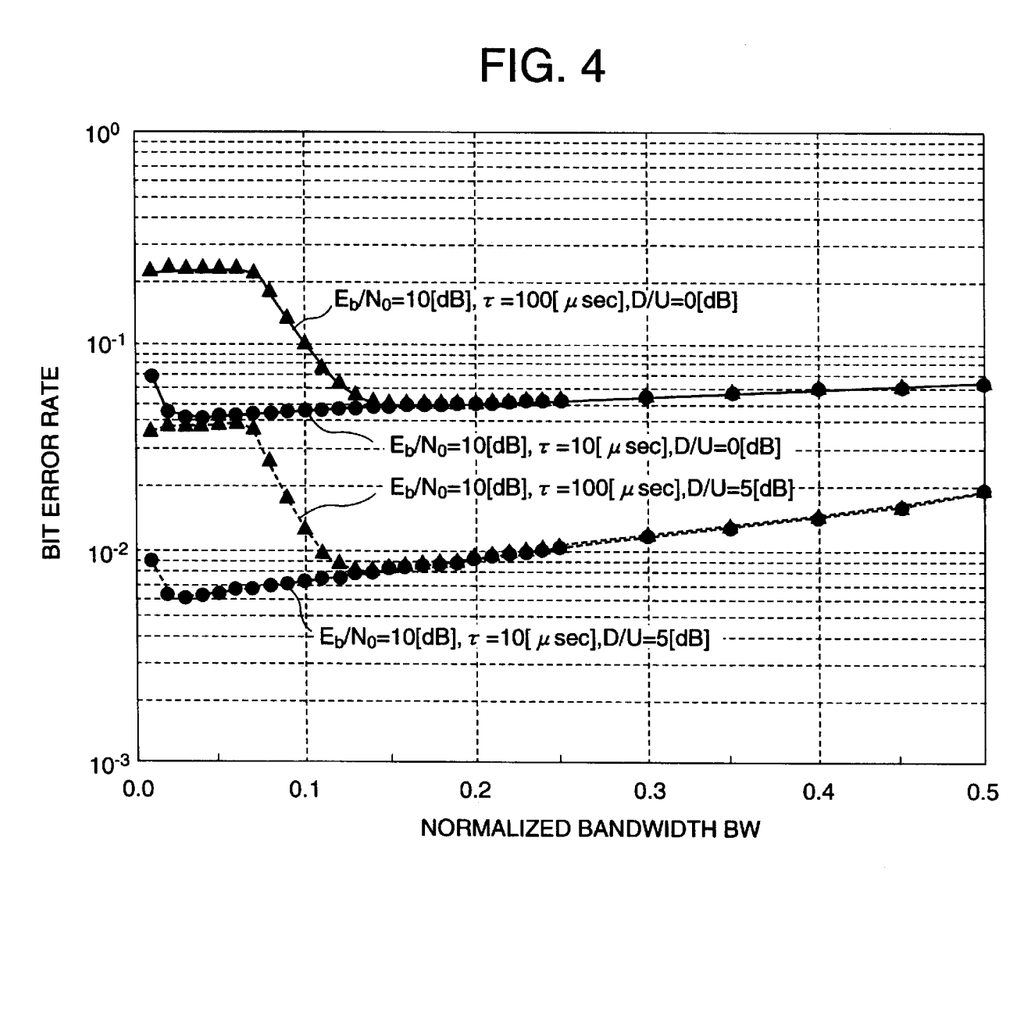
FIG. 4 is a graph showing bit error rate characteristics against the bandwidth of a filter of synchronous detection type OFDM receiver according to the first embodiment of the present invention.

Thus, in the receiver, the bandwidth of the filter 8 should be designated to a proper value. At this point, the bit error rate becomes optimum. FIG. 4 is a graph showing the relation between the normalized bandwidth BW of the filter 8 that filters the channel frequency response (horizontal axis) and the bit error rate of the OFDM symbols (vertical axis) in the case that the delay time of the delayed signal is a parameter.

In FIG. 4, a two-wave model of which delay times τ of channel frequencies are 10 [μsec] and 100 [μsec] is shown. In this case, the desired wave against interfered wave D/U is 5 [dB]and 0 [dB]. The sub-carrier interval of the OFDM symbol is 1 [kHz]. The number of sub-carriers that transmit the OFDM symbol is 200. The guard time is 250 [μsec]. The modulation system is QPSK. The filter 8 is a low pass roll-off filter of which the tap length is 64 and the roll-off coefficient is 0.5. FIG. 4 shows that the bit error rate varies depending on the bandwidth of the filter 8. In particular, when D/U=5 [dB], the influence of the bandwidth of the filter is very large. When the bit error rate is the minimum, the bandwidth is largely affected by the delay time of the delayed signal. When the delay time of the channel frequency τ=10 [μsec], the normalized bandwidth is preferably designated to 0.02 to 0.10. When the delay time of the channel frequency τ=100 [μsec], the normalized bandwidth is preferably designated to 0.10 to 0.20.

Figure 5:
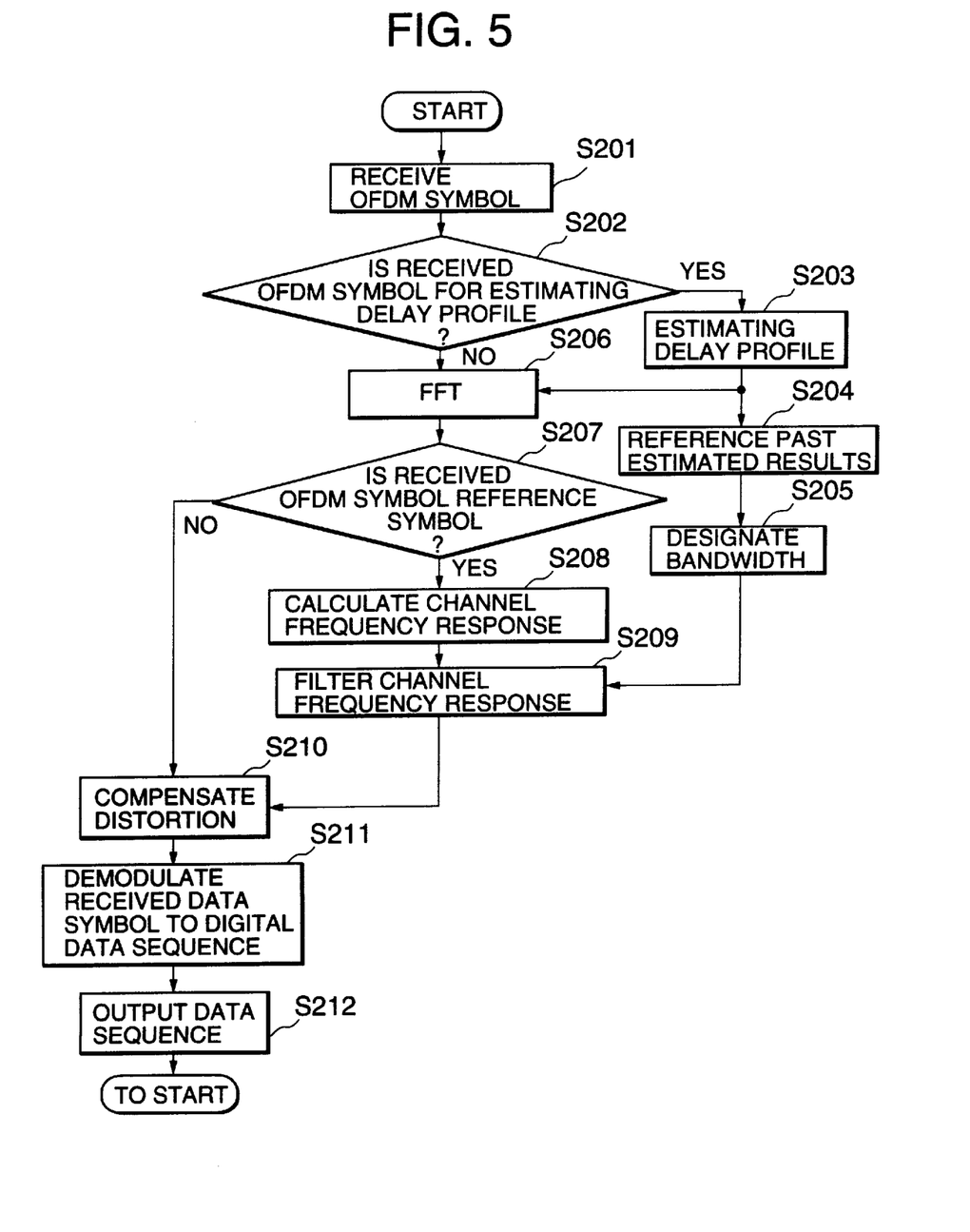
FIG. 5 is a flow chart showing an example of a second operation of the synchronous detection type OFDM receiver according to the first embodiment of the present invention.

FIG. 5 is a flow chart showing an example of a second operation of the synchronous detection type OFDM receiver according to the first embodiment of the present invention.

In the example of the second operation, the bandwidth of the filter 8 that filters a calculated channel frequency response is determined by estimating a plurality of delay times.

As shown in FIG. 5, in the case of the example of the second operation, when the RF receiver 2 receives an OFDM symbol (at step 201), it is determined whether or not the received symbol is a delay time estimating symbol with a strong correlation on the time axis (at step 202).

When the received symbol is a delay time estimating symbol (namely, the determined result at step 202 is Yes), the received delay time estimating symbol is supplied to the delay time detector 3. The delay time detector 3 estimates the delay time due to the multi-path propagation environment (at step 203). The delay time estimated result is supplied from the delay time detector 3 to the bandwidth designator 4.

The bandwidth designator 4 stores delay time estimated results of delay times that have been estimated past. The bandwidth designator 4 references the past delay time estimated results that are stored (at step 204). Thus, the bandwidth designator 4 calculates the average value of the delay time estimated results and designates the bandwidth of the filter 8 with the average value (at step 205). Alternatively, the delay time estimated results of delay times that have been estimated past may be weighted. With the combined result, a bandwidth may be designated.

As the determined result of the received symbol by the RF receiver 2, when the received symbol is not a delay time estimating symbol (namely, the determined result at step 202 is No) or when the received symbol is a delay time estimating symbol for calculating a channel frequency response, the received symbol is supplied to the fast Fourier transforming portion 5 (at step 206). The fast Fourier transforming portion 5 performs the FFT process for the received symbol, transforms the received symbol into a signal in the frequency domain, and supplies the resultant signal to the channel frequency response calculator 7.

On the other hand, when the RF receiver 2 receives a reception reference symbol for calculating a channel frequency response (namely, the determined result at step 207 is Yes), the transmitted reference symbol generator 6 generates a transmitted reference symbol and supplies the transmitted reference symbol to the channel frequency response calculator 7.

The channel frequency response calculator 7 receives an output signal of the fast Fourier transforming portion 5 (the reception reference symbol that has been transformed into a signal in the frequency domain) and the transmitted reference symbol generated by the transmitted reference symbol generator 6. Thus, the channel frequency response calculator 7 calculates the channel frequency response (frequency characteristics) with these symbols (at step 208) and supplies the calculated channel frequency response to the filter 8. The filter 8 filters the channel frequency response received from the channel frequency response calculator 7 (at step 209), suppresses the noise component, and supplies the resultant channel frequency response to the distortion compensator 9.

The distortion compensator 9 receives a channel frequency response whose noise component has been suppressed and a received data symbol that has been FFT-processed. Thus, the distortion compensator 9 compensates the distortion of the received data symbol with the channel frequency response whose noise component has been suppressed (at step 210) and supplies the resultant received data symbol to the demodulator 10.

The demodulator 10 demodulates the received data symbol whose distortion has been compensated to a digital data sequence (at step 211) and outputs the resultant data sequence (at step 212).

In the synchronous detection type OFDM receiver according to the first embodiment, the channel frequency response calculated with the reception reference symbol and the transmitted reference symbol is filtered in the frequency domain. The distortion of the received symbol is compensated with the channel frequency response that has been filtered. The bandwidth of the filter 8 is designated with the delay time calculated results of the delayed signal due to the multi-path propagation environment. Thus, the bandwidth of the filter 8 can be designated corresponding to the propagation environment of the radio wave at the point. Consequently, even if the propagation environment of the radio wave largely varies, the distortion of the received signal due to the multi-path propagation environment can be properly compensated. Thus, the receiver performance are improved.

In other words, the bandwidth of the filter 8 that filters the channel frequency response obtained in the frequency domain by the receiver can be designated to a proper value. Thus, the synchronous detecting operation can be effectively performed.

In addition, as in the example of the second operation, the average value of the delay times of the delayed signals that have been estimated past is calculated. With the calculated result, the bandwidth of the filter 8 is designated. Thus, the designating accuracy of the bandwidth of the filter 8 can be improved. Consequently, when the propagation environment instantaneously varies, the bandwidth of the filter 8 can be prevented from being changed.

When the bandwidth designator 4 references the delayed signal estimated results of which the delayed signals have been estimated past, in addition to the delay times of the delayed signals, the received power levels may be estimated by the delay time detector 3. The estimated results of the delay times and the received power levels that have been estimated past are stored in the bandwidth designator 4. After a predetermined number of estimated results are obtained, a delayed signal with a power level that exceeds a predetermined value is selected. With the delay time of the selected delayed signal, even if a plurality of delayed signals arrive at the receiver, the bandwidth of the filter 8 can be designated to a value suitable to the proper channel frequency.

Thus, the distortion of the waveform in the frequency domain of the received OFDM symbol (in particular, the distortion due to the multi-path propagation environment propagation environment) is alleviated. Consequently, the receiver performance can be improved.

In the first embodiment, the structure of which the receiver calculates a channel frequency response with one reference symbol is shown. Alternatively, a channel frequency response may be calculated with a plurality of symbols.

Figure 6:
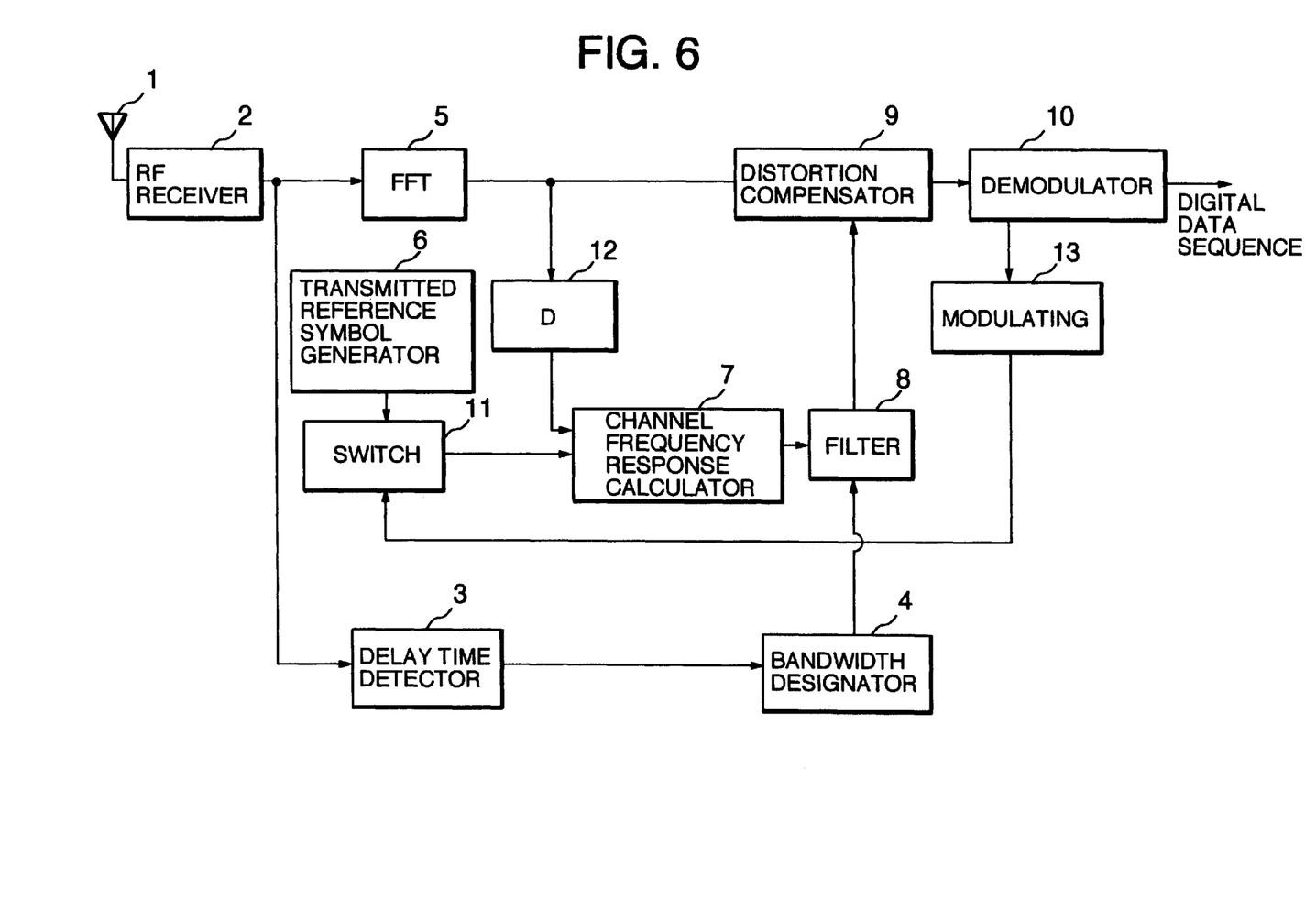
FIG. 6 is a block diagram showing the structure of a synchronous detection type OFDM receiver according to a second embodiment of the present invention.

Next, a synchronous detection type OFDM receiver according to a second embodiment of the present invention will be described.

FIG. 6 is a block diagram showing the structure of the synchronous detection type OFDM receiver according to the second embodiment of the present invention.

For simplicity, in FIG. 6, similar portions to those of the first embodiment are denoted by similar reference numerals and their description is omitted.

In the second embodiment, a frequency spectrum signal of a known transmitted reference symbol has been provided to the synchronous detecting OFDM receiver. With a frequency spectrum signal of which a demodulated data sequence has been re-modulated, a channel frequency response is calculated.

As shown in FIG. 6, the synchronous detection type OFDM receiver according to the second embodiment of the present invention comprises an antenna 1, a RF receiver 2, a delay time detector 3, a bandwidth designator 4, a fast Fourier transforming portion (FFT) 5, a transmitted reference symbol generator 6, a channel frequency response calculator 7, a filter 8, a distortion compensator 9, a demodulator 10, a switch 11, a delaying portion 12, and a modulator 13.

The transmitted reference symbol generator 6 generates a signal in the frequency domain of a known reference symbol received by the RF receiver 2 and supplies the generated signal to the switch 11. The switch 11 selects one of two signals received from the transmitted reference symbol generator 6 and the modulator 13 and supplies the selected signal to the channel frequency response calculator 7.

For example, for the reference symbol received by the RF receiver 2 at first, the output signal of the transmitted reference symbol generator 6 is used. For a data symbol received after the reference symbol, the output signal of the modulator 13 is used. Thus, even if the received data symbol is used, the channel frequency response can be calculated. Thereafter, every predetermined time period, the output signal of the transmitted reference symbol generator 6 may be used.

The fast Fourier transforming portion 5 supplies the transformed signal to the distortion compensator 9 and the delaying portion 12. The delaying portion 12 delays the received signal for one symbol and supplies the resultant signal to the channel frequency response calculator 7. The channel frequency response calculator 7 calculates a channel frequency response with the output signal of the delaying portion 12 and the output signal of the switch 11 and supplies the calculated channel frequency response to the filter 8. In this embodiment, the output signal of the filter 8 is directly supplied to the distortion compensator 9. Alternatively, the channel frequency response may be calculated with a plurality of symbols of the output signal of the filter 8. The modulator 13 re-modulates the digital data sequence that has been demodulated by the demodulator 10 to a reference symbol that is transformed into a signal in the frequency domain and supplies the resultant reference symbol to the switch 11. Thus, the channel frequency response used for compensating the distortion of the next data symbol is calculated. The channel frequency response calculator 7 calculates a channel frequency response for compensating the distortion of the current data symbol with the received data symbol that has been delayed for one symbol by the delaying portion 12 and the reference symbol that has been re-modulated and output from the modulator 13.

Figure 7:
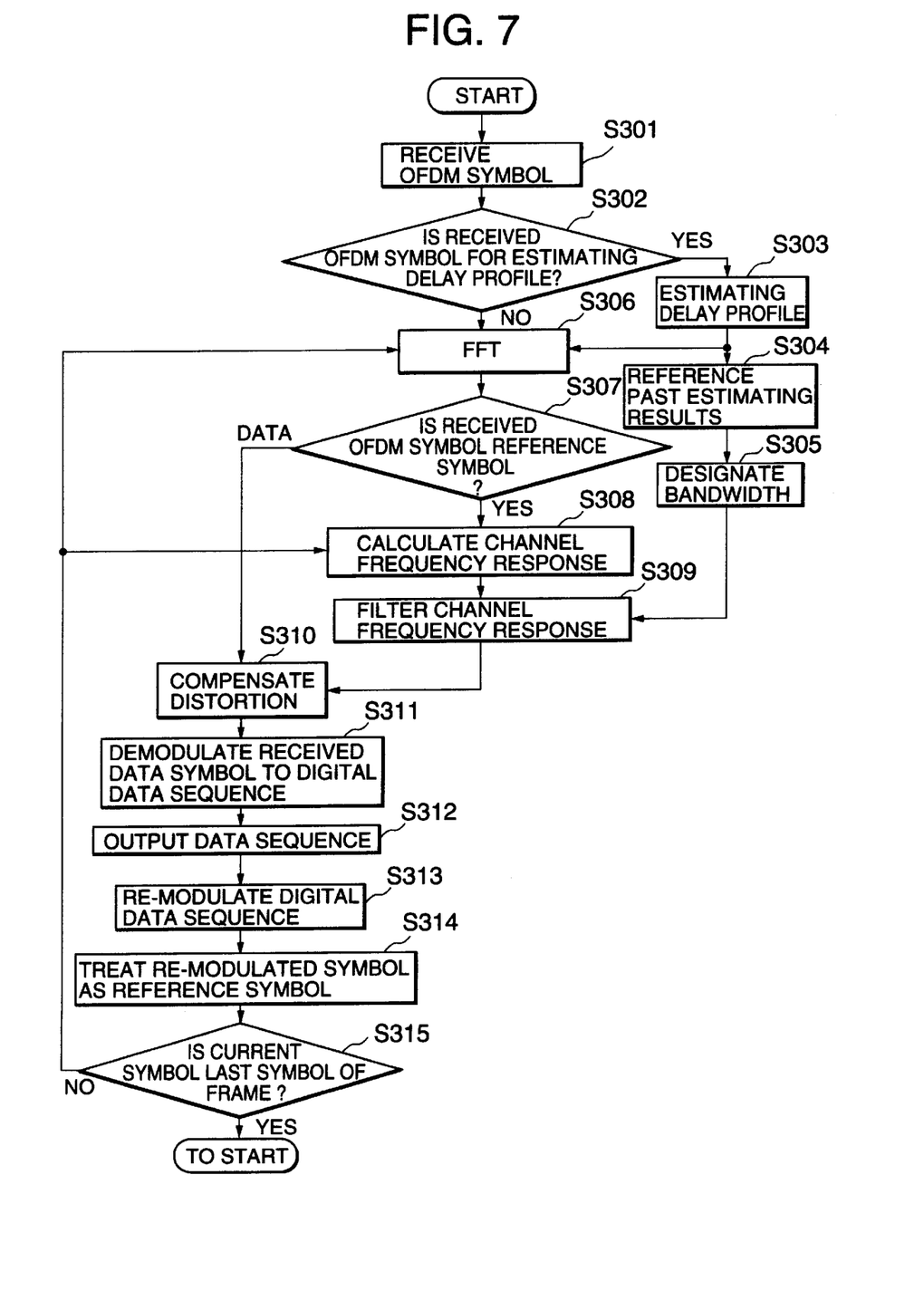
FIG. 7 is a flow chart showing an operation of the synchronous detection type OFDM receiver according to the second embodiment of the present invention.

Next, with reference to a flow chart shown in FIG. 7, the operation of the synchronous detection type OFDM receiver according to the second embodiment of the present invention will be described.

In the synchronous detection type OFDM receiver according to the second embodiment, when the RF receiver 2 receives an OFDM symbol (at step 301), the RF receiver 2 determines whether or not the received symbol is a delay time estimating symbol with a strong correlation on the time axis (at step 302).

When the received symbol is a delay time estimating symbol (namely, the determined result at step 302 is Yes), the delay time estimating symbol is supplied to the delay time detector 3. The delay time detector 3 estimates the delay time of the delayed signal (at step 303). One delay time or a plurality of delay times are estimated. The delay time estimated results are successively supplied to the bandwidth designator 4.

The bandwidth designator 4 has stored n estimated results. The bandwidth designator 4 references the n delay time estimated results (at step 304). The bandwidth designator 4 determines the bandwidth of the filter 8 that filters the channel frequency response with the referenced estimated results and designates the determined bandwidth to the filter 8 (at step 305).

On the other hand, when the received symbol is not a delay time estimating symbol (namely, the determined result at step 302 is No) or when the received symbol is a delay time estimating symbol for calculating the channel frequency response, the received symbol is supplied to the fast Fourier transforming portion 5. The fast Fourier transforming portion 5 performs the fast Fourier transforming process for the received symbol (at step 306), transforms the resultant signal to a signal in the frequency domain, and supplies the resultant signal to the channel frequency response calculator 7.

When the RF receiver 2 receives a known reference symbol for calculating a channel frequency response (namely, the determined result at step 307 is Yes), the transmitted reference symbol generator 6 generates a known transmitted reference symbol and supplies the generated symbol to the channel frequency response calculator 7 through the switch 11.

The channel frequency response calculator 7 calculates a channel frequency response corresponding to the known reception reference symbol that has been transformed into a signal in the frequency domain and the known transmitted reference symbol received from the transmitted reference symbol generator 6 (at step 308). The calculated channel frequency response is supplied to the filter 8. The filter 8 filters the channel frequency response in the frequency domain (at step 309) and obtains a channel frequency response whose noise component has been suppressed.

When the RF receiver 2 receives a data symbol followed by the known reference symbol, the received data symbol is transformed into a signal in the frequency domain by the fast Fourier transforming portion 5. Thereafter, the distortion of the signal is compensated corresponding to the channel frequency response generated with the preceding symbol (at step 310). The data symbol whose distortion has been compensated is supplied to the demodulator 10.

The demodulator 10 demodulates a symbol whose distortion has been compensated to a digital data sequence (at step 311). The digital data sequence is supplied to the modulator 13 (at step 312).

The modulator 13 re-modulates the received digital data sequence (at step 313) and supplies the resultant re-modulated symbol to the switch 11. The re-modulated symbol is treated as a transmitted reference symbol for calculating a channel frequency response for compensating the distortion of the next data symbol (at step 314). Until the last symbol of the frame is received, the compensation of the distortion of the received signal with the channel frequency response calculated with the preceding data symbol is repeated (at step 315).

In other words, in the synchronous detection type OFDM receiver according to the second embodiment, the distortion of the received data symbol is compensated with the channel frequency response calculated with the preceding data symbol. Thus, the received data symbol is demodulate to a digital data symbol.

As described above, in the synchronous detection type OFDM receiver according to the second embodiment, when the channel frequency response is calculated, in addition to a known reference symbol transmitted by the transmitter, a data symbol that has been re-modulated is used as a reference symbol. Thus, data similar to the real propagation environment can be used. Consequently, the bandwidth designating accuracy of the filter 8 can be further improved.

In the second embodiment, the operation of which the waveform of the current data symbol is equalized with the channel frequency response calculated with the preceding data symbol was described. However, the channel frequency response used for equalizing the waveform may be the average value of a plurality of channel frequency response calculated results or a combined result of weighted channel frequency response calculated results.

Figure 8:
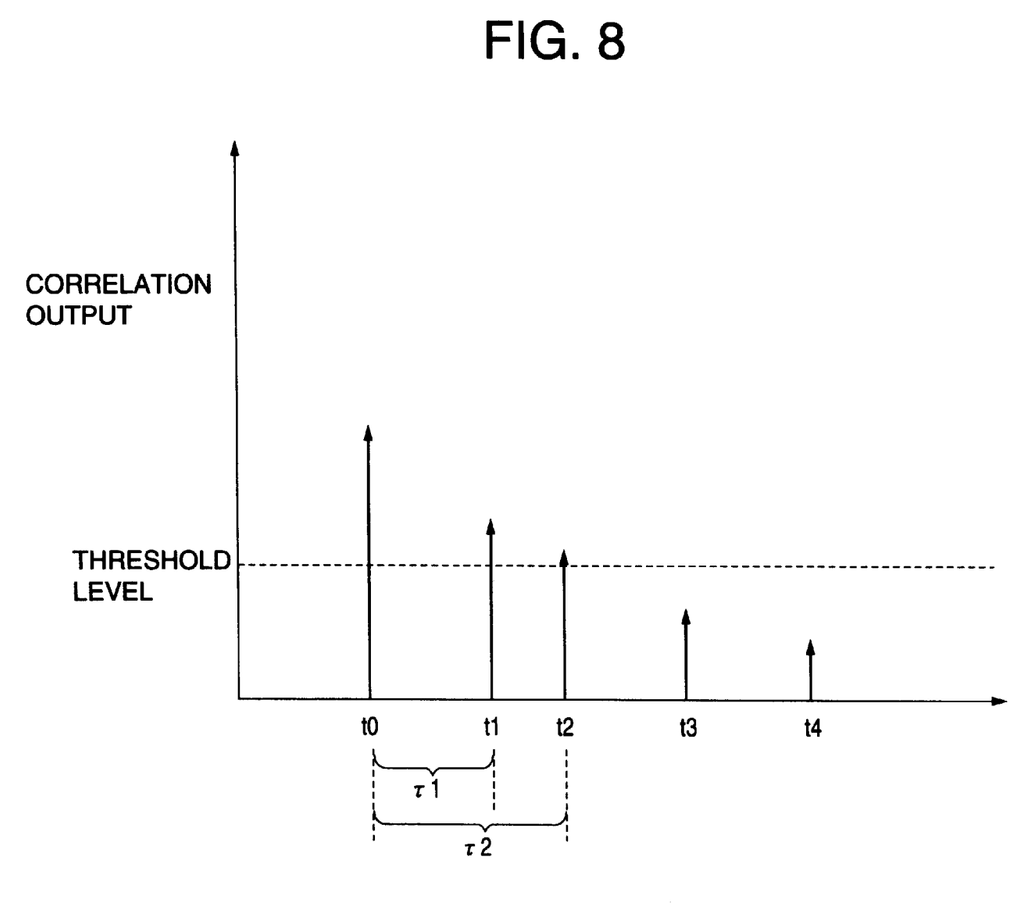
FIG. 8 is a graph showing a delay time estimated result according to the present invention.

Next, with reference to FIG. 8, a self correlation output estimated result in the case that the above-described synchronous detection type OFDM receiver has received a delay time estimating symbol with a strong correlation on the time axis will be described. FIG. 8 is a graph showing the self correlation output estimated result in the case that the receiver has received a delay time estimating symbol with a strong correlation on the time axis.

In FIG. 8, the horizontal axis represents the arrival time of a received signal, whereas the vertical axis represents a correlation output thereof.

According to the self correlation output estimated result shown in FIG. 8, when there are a plurality of delayed signals, if a delay time estimating symbol with a strong correlation on the time axis is received, there are peaks of correlation outputs due to delayed signals along with the peak of the arrival time $t_0$ of the desired wave.

According to the self correlation output estimated result, there are peaks of the correlation outputs of the received delayed signals from time $t_1$ to time $t_4$. Among these peaks, the correlation outputs of the received signals that arrive at time $t_1$ and time $t_2$ exceed the threshold level. The bandwidth designator 4 selects the delay time $\tau_2$ at time $t_2$ from the desired signal, determines a proper value of the bandwidth to be filtered, and designates the determined value as the bandwidth of the filter 8.

Figure 9:
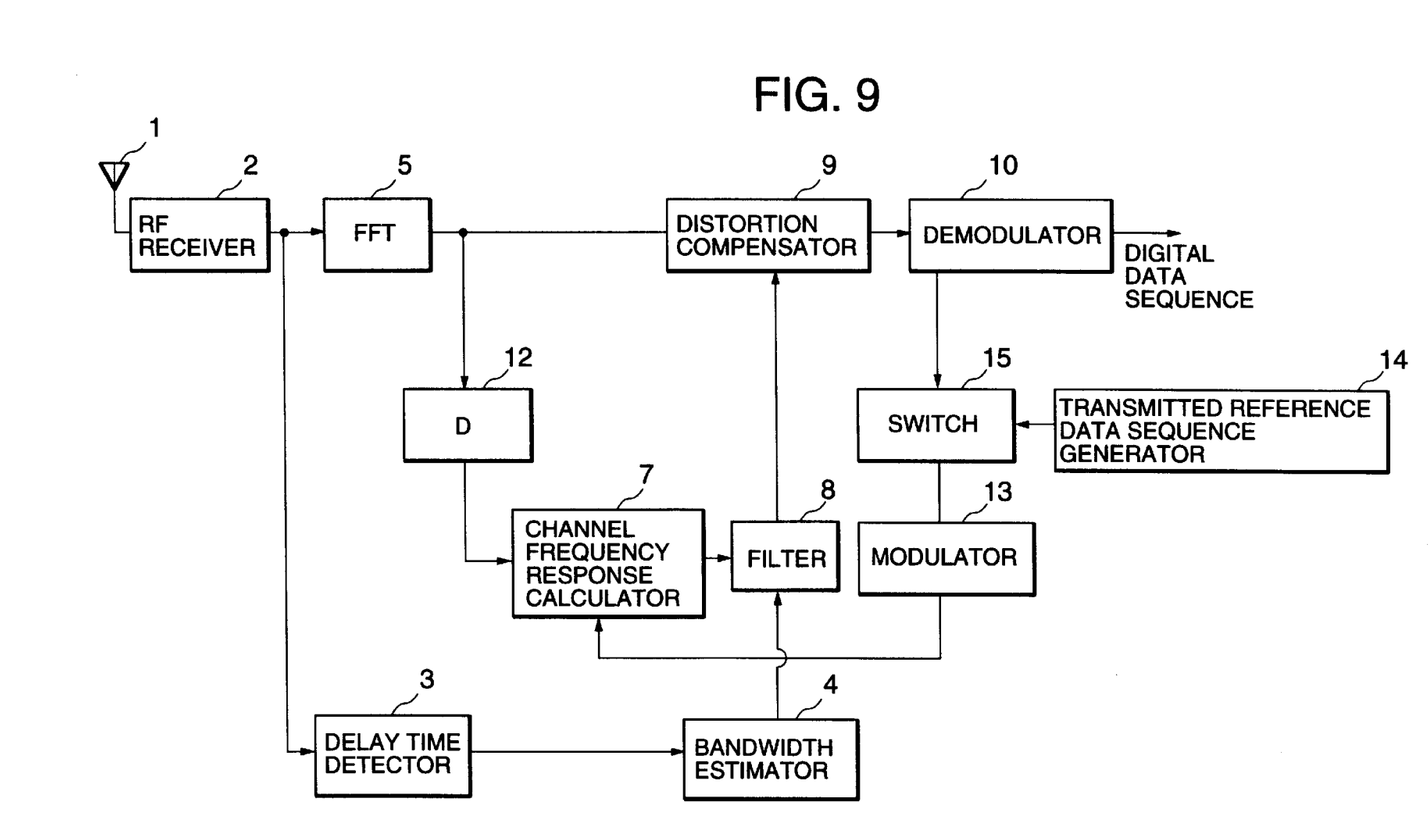
FIG. 9 is a block diagram showing the structure of a synchronous detection type OFDM receiver according to a third embodiment of the present invention.

Next, a synchronous detection type OFDM receiver according to a third embodiment of the present invention will be described. FIG. 9 is a block diagram showing the structure of the synchronous detection type OFDM receiver according to the third embodiment of the present invention. In the third embodiment, the synchronous detection type OFDM receiver provides a transmitted reference symbol data sequence.

As shown in FIG. 9, the synchronous detection type OFDM receiver according to the third embodiment does not have the transmitted reference symbol generator 6 according to the second embodiment shown in FIG. 6. Instead, the synchronous detection type OFDM receiver according to the third embodiment has a transmitted reference data sequence generator 14.

Since the operation of the synchronous detection type OFDM receiver according to the third embodiment is almost the same as that of the second embodiment, only the different points will be described.

The method for generating a known transmitted reference symbol that the synchronous detection type OFDM receiver of the third embodiment has is different from that of the second embodiment.

In other words, when the receiver 2 receives a known reference symbol used as a reference symbol for calculating a channel frequency response, the transmitted reference data sequence generator 14 generates a digital data sequence of a transmitted reference symbol. The modulator 13 generates a digital data sequence of a transmitted reference symbol of the transmitted reference data sequence generator 14. The modulator 13 modulates the digital data sequence, generates a known transmitted reference symbol, and supplies the generated symbol to the channel frequency response calculator 7.

When the receiver receives a data symbol, the switch 15 supplies the output signal of the demodulator 10 to the modulator 13. The modulator 13 re-modulates the received digital data sequence, generates a reference symbol, and supplies the generated symbol to the channel frequency response calculator 7.

The channel frequency response calculator 7 calculates a channel frequency response with the known transmitted reference symbol that is output from the modulator 13 and the reference symbol that has been delayed for one symbol by the delaying portion 12 and that has been transformed in the frequency domain.

In the synchronous detection type OFDM receiver according to the third embodiment of the present invention, the switch 15 selects the digital data sequence demodulated by the demodulator 10 or the digital data sequence generated by the transmitted reference data sequence generator 14 and supplies the selected digital data sequence to the modulator 13. The modulator 13 modulates the digital data sequence and feeds back the modulated data to the channel frequency response calculator 7. Thus, the channel frequency response calculator 7 calculates a channel frequency response. Consequently, while the receiver is receiving a data symbol, it can designate a proper bandwidth value to the filter 8.

As described above, according to the present invention, since delayed signals of received OFDM signals due to the multi-path propagation environment are estimated, the bandwidth of the filtering means can be properly designated corresponding to the propagation environment when the radio wave is received. Thus, the receiver performance can be improved.

In addition, according to the present invention, when a radio wave is received, the bandwidth of the filtering means is designated. Thus, even if the propagation environment of the radio wave varies, the distortion of the received signals due to the multi-path propagation environment can be properly compensated. Alternatively, a plurality of estimated results are averaged or weighted and then combined. Thus, even if the propagation environment of the radio wave instantaneously varies, the bandwidth of the filtering means can be prevented from being changed.

Moreover, according to the present invention, even if a plurality of delayed signals arrive at the receiving apparatus, the bandwidth of the filtering means can be designated with delay time of a delayed signal whose signal level is high. Thus, the bandwidth of the filtering means can be designated to a value corresponding to the propagation environment.

In other words, by alleviating the distortion of the waveform in the frequency domain (in particular, the influence of the distortion of the waveform due to the multi-path propagation environment), the receiver performance can be improved.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A receiving apparatus, comprising:
receiving means for receiving an orthogonal frequency division multiplexing signal;
transforming means for transforming the orthogonal frequency division multiplexing signal received by said receiving means into a frequency spectrum signal;
reference signal generating means for generating a reference frequency spectrum signal;
channel frequency response calculating means for calculating a channel frequency response with the reference frequency spectrum signal generated by said reference signal generating means and the frequency spectrum signal transformed by said transforming means;
filtering means for filtering the channel frequency response calculated by said channel frequency response calculating means;
delayed signal estimating means for estimating a delayed signal in a multi-path propagation environment received by said receiving means;
bandwidth designating means for designating the bandwidth of said filtering means with information of the delayed signal estimated by said delayed signal estimating means;
distortion compensating means for compensating a distortion in the frequency domain due to the multi-path propagation environment of the frequency spectrum signal transformed by said transforming means with the channel frequency response filtered by said filtering means; and
demodulating means for demodulating the frequency spectrum signal whose distortion has been compensated by said distortion compensating means to a digital data sequence.

2. The receiving apparatus as set forth in claim 1, wherein said bandwidth designating means stores information of power or amplitude levels and delay times of the received delayed signals estimated by said delayed signal estimating means and designates the bandwidth of said filtering means with the information.

3. The receiving apparatus as set forth in claim 1, wherein said bandwidth designating means selects delay time of a delayed signal whose power or amplitude level exceeds a predetermined value from the information that has been stored and designates the bandwidth of said filtering means with the selected delay time.

4. The receiving apparatus as set forth in claim 2, wherein said bandwidth designating means calculates based on a plurality of the stored information the average value of a plurality of delay times and designates the bandwidth of said filtering means with the calculated result.

5. The receiving apparatus as set forth in claim 2, wherein said bandwidth designating means weights based on a plurality of the stored information a plurality of delay times, combines the weighted results, and designates the bandwidth of said filtering means with the combined result.

6. The receiving apparatus as set forth in claim 1,
wherein said reference signal generating means has:
re-modulating means for re-modulating the digital data sequence demodulated by said demodulating means to the reference frequency spectrum signal;
delaying means for outputting the frequency spectrum signal transformed by said transforming means directly or by delaying the frequency spectrum signal to said channel frequency response calculating means;
transmitted reference signal generating means for generating a transmitted reference frequency spectrum signal; and
signal switching means for selecting either the transmitted reference frequency spectrum signal generated by said transmitted reference signal generating means or the reference frequency spectrum signal generated by said re-modulating means and outputting the selected signal to said channel frequency response calculating means.

7. The receiving apparatus as set forth in claim 6,
wherein said channel frequency response calculating means calculates a channel frequency response with the reference frequency spectrum signal received from said signal switching means and the received frequency spectrum signal corresponding to the reference frequency spectrum signal.

8. The receiving apparatus as set forth in claim 6,
wherein said channel frequency response calculating means calculates a channel frequency response with the frequency spectrum signal delayed by said delaying means when the reference frequency spectrum signal generated by said re-modulating means is input.

9. The receiving apparatus as set forth in claim 1, further comprising:
re-modulating means for re-modulating a digital data sequence demodulated by said demodulating means to the reference frequency spectrum signal;
delaying means for delaying the frequency spectrum signal transformed by said transforming means; and
outputting means for outputting the reference frequency spectrum signal generated by said re-modulating means and the frequency spectrum signal delayed by said delaying means to said channel frequency response calculating means.

10. The receiving apparatus as set forth in claim 1,
wherein said reference signal generating means has:
delaying means for delaying the frequency spectrum signal transformed by said transforming means and outputting the resultant signal to said channel frequency response calculating means;
reference digital data sequence generating means for generating a reference digital data sequence;
signal switching means for selecting either the reference digital data sequence generated by said reference digital data sequence generating means or the digital data sequence demodulated by said demodulating means; and
re-modulating means for re-modulating the digital data sequence received from said signal switching means to the reference frequency spectrum signal and outputting the generated reference frequency spectrum signal to said channel frequency response calculating means.

11. The receiving apparatus as set forth in claim 10,
wherein said channel frequency response calculating means calculates a channel frequency response with the reference frequency spectrum signal received from said re-modulating means and the frequency spectrum signal delayed by said delaying means.

12. A receiving method, comprising the steps of:
receiving an orthogonal frequency division multiplexing signal;
transforming the orthogonal frequency division multiplexing signal into a frequency spectrum signal;
generating a reference frequency spectrum signal;
calculating a channel frequency with the reference frequency spectrum signal and the frequency spectrum signal;
estimating delay time of a delayed signal due to a multi-path propagation environment of the received orthogonal frequency division multiplexing signal;
filtering the channel frequency response with the delay time of the delayed signal that has been estimated;
compensating a distortion in the frequency domain due to the multi-path propagation environment of the frequency spectrum signal with the filtered channel frequency response; and
demodulating a digital data sequence with the frequency spectrum signal whose distortion has been compensated.

* * * * *

UNITED STATES PATENT AND TRADEMARK OFFICE
CERTIFICATE OF CORRECTION

PATENT NO.    : 6,219,334 B1
DATED         : April 17, 2001
INVENTOR(S)   : Kazumi Sato et al.

It is certified that error appears in the above-identified patent and that said Letters Patent is hereby corrected as shown below:

Column 9,
Line 24, delete "propagation environment".

Column 11,
Line 59, delete "demodulate" and insert -- demodulated --.

Signed and Sealed this

Twenty-sixth Day of March, 2002

Attest:

JAMES E. ROGAN
*Attesting Officer*       *Director of the United States Patent and Trademark Office*